(12) United States Patent
Juncker

(10) Patent No.: US 7,496,804 B2
(45) Date of Patent: Feb. 24, 2009

(54) COMMUNICATIONS SYSTEM, RECEIVER, AND METHOD OF ESTIMATING RECEIVED SIGNAL QUALITY BY USING BIT ERROR RATE

(75) Inventor: Carsten Juncker, Lyngby (DK)

(73) Assignee: Nokia Corporation, Espoo (FI)

( * ) Notice: Subject to any disclaimer, the term of this patent is extended or adjusted under 35 U.S.C. 154(b) by 652 days.

(21) Appl. No.: 11/210,788

(22) Filed: Aug. 25, 2005

(65) Prior Publication Data

US 2006/0053352 A1 Mar. 9, 2006

(30) Foreign Application Priority Data

Sep. 1, 2004 (FI) .................... 20045318

(51) Int. Cl.
*G06F 11/00* (2006.01)
*G01R 31/00* (2006.01)
(52) U.S. Cl. ....................... 714/704; 714/745
(58) Field of Classification Search ....................... None
See application file for complete search history.

(56) References Cited

U.S. PATENT DOCUMENTS 5,253,126 A * 10/1993 Richmond .................... 360/53
5,751,725 A * 5/1998 Chen ........................... 714/708
6,522,696 B1 * 2/2003 Mobin et al. ................. 375/262

FOREIGN PATENT DOCUMENTS

EP 0 969 608 A2 1/2000
WO WO 97/27686 7/1997
WO WO 99/48237 9/1999
WO WO 01/03332 A1 1/2001
WO WO 02/096149 A1 11/2002

OTHER PUBLICATIONS

John Wiley & Sons, Ltd.; "Harri Holma & Antti Toskala, WSDMA for UMTS"; pp. 196-201.
3GPP TS 25.211 v6.1.0; "3rd Generation Partnership Project; Technical Specification Group Radio Access Network; Physical Channels & Mapping of Transport Channels Onto Physical Channels (FDD) (Release 6)"; pp. 1-51; Jun. 2004.
3GPP TS 25.302 v6.1.0; "3rd Generation Partnership Project; Technical Specification Group Radio Access Network; Services Provided by the Physical Layer (Release 6)"; pp. 1-65; Mar. 2004.
Korean Office Action dated Apr. 25, 2008.

* cited by examiner

*Primary Examiner*—Christine T Tu
(74) *Attorney, Agent, or Firm*—Squire, Sanders & Dempsey L.L.P.

(57) ABSTRACT

There is provided a receiver comprising a processing unit, a communications unit for receiving frames including training sequence symbols or pilot symbols, the processing unit being configured to use Cyclic Redundancy Check for detecting errors in the received frames. When no errors in a given frame are discovered on the basis of the Cyclic Redundancy Check, the processing unit is further configured to define a TSC, training sequence code, bit error rate for the bursts of the given frame on the basis of the training sequence symbols or the pilot symbols; to define an upper limit for the TSC bit error rate; and to determine the given frame to be bad when the TSC bit error rate for the bursts of the given frame is greater than the upper limit of the TSC bit error rate.

21 Claims, 3 Drawing Sheets

COMMUNICATIONS SYSTEM, RECEIVER, AND METHOD OF ESTIMATING RECEIVED SIGNAL QUALITY BY USING BIT ERROR RATE

FIELD

The invention relates to a method of estimating received signal quality in a communications system, to a communications system, and to a receiver for a communications system. The invention relates especially to estimating speech frame quality in a communications system.

BACKGROUND

Traditional measures used today for estimating the quality of a received signal comprise Signal-to-Noise-Ratio (SNR) estimates per burst, estimation of the Mean Signal-to-Noise-Ratio (E[SNR]) contributing to a given GSM (Global System for Mobile communications) frame/block, estimation of the Signal-to-Noise-Ratio variance (Var[SNR]) of bursts contributing to a given GSM frame/block, and Pseudo-Bit-Error-Rate (PBER) computation based on the received information bits.

The SNR measures listed above are highly dependent on modification and on changes in both the various RX (receiver) algorithms and in the actual HW (hardware) platform. For example, the PBER depends on the actual coding scheme which is a major disadvantage when several different coding schemes are used within a communications system.

Some communication systems transmit additional information which a receiver utilizes for the validation/estimation of the received signal quality; e.g. in GSM speech channels, three to eight additional bits (denoted parity bits) are transmitted along with the information bits. On GSM control channels, additional sixteen bits are transmitted. A Cyclic Redundancy Check (CRC) as defined by the 3GPP ($3^{rd}$ Generation Partnership Project) may then be carried out in the receiver on the basis of these parity bits in order to determine whether the received speech frame is good or bad.

However, a three-bit CRC of the GSM standard alone does not indicate erroneous frames reliably. Besides the CRC check additional measurements are therefore included in the Bad Frame Indication (BFI) algorithms in order to improve the reliability of the bad frame detection.

Bit error rate (BER) is a measurement of transmission quality and it indicates how many bits are incorrectly transmitted in a given bit stream. BER is a ratio of the number of bit errors to the total number of bits transmitted in a given time interval.

There are several alternatives, in addition to the CRC method, for designing BFI algorithms. An example of a Bad Frame Indication algorithm can be written as:

$$(PBER > (BFI_{lim} = W_{SNR} \cdot Var\lfloor S\hat{N}R \rfloor + K_{SNR})) \quad (1)$$

or $$(E\lfloor S\hat{N}R \rfloor < SNR_{min}) \quad (2)$$

or
!CRC
where:
PBER denotes a Pseudo-Bit-Error-Rate,
$BFI_{lim}$ computation is limited to the range $BFI_{min} < BFI_{lim} < BFI_{max}$,
$W_{SNR}$, $K_{SNR}$, $SNR_{min}$, $BFI_{min}$ and $BFI_{max}$ are constants determined empirically through simulations. In an adaptive part of the BFI algorithm the $BFI_{lim}$ value is computed on a frame per frame basis as a function of the estimated frame Signal-to-Noise-Ratio variance (Var [SNR]). If the computed $BFI_{lim}$ value lies outside the specified $BFI_{lim}$ range, the value is set either to $BFI_{min}$ or $BFI_{max}$. Examples of implemented BFI algorithm values are shown in table 1.

TABLE 1

| $W_{SNR}$ | $K_{SNR}$ | $BFI_{min}$ | $BFI_{max}$ | $SNR_{min}$ |
|---|---|---|---|---|
| 20 | 44 | 50 | 65 | −0.2 dB |

Thus, a given speech frame can be defined to be bad on the basis of three conditions: the PBER exceeds a frame specific threshold determined by the SNR variance of N bursts contributing to the speech frame, N representing an interleave depth; or the average Signal-to-Noise-Ratio (E[SNR]) of the N bursts contributing to the given speech frame does not exceed a predetermined SNR limit; or the Cyclic Redundancy Check (CRC) defined by the 3GPP is marked as failed.

BRIEF DESCRIPTION OF THE INVENTION

According to an aspect of the invention, there is provided a method of estimating received signal quality in a communications system, the method comprising receiving speech frames including training sequence symbols or pilot symbols, each speech frame being transmitted in a known number of successive bursts on different channels of the communications system. The method comprising defining a TSC, training sequence code, bit error rate for the bursts of the given speech frame on the basis of the training sequence symbols or the pilot symbols; defining an upper limit for the TSC bit error rate; and determining the given speech frame to be bad when the TSC bit error rate for the bursts of the given speech frame is greater than the upper limit of the TSC bit error rate.

According to an aspect of the invention, there is provided a method of estimating received signal quality in a communications system using Cyclic Redundancy Check for detecting errors in transmitted speech frames, the method comprising receiving speech frames including training sequence symbols or pilot symbols, each speech frame being transmitted in a known number of successive bursts on different channels of the communications system. When no errors in a given speech frame are discovered on the basis of the Cyclic Redundancy Check, the method further comprising: defining a TSC, training sequence code, bit error rate for the bursts of the given speech frame on the basis of the training sequence symbols or the pilot symbols; defining an upper limit for the TSC bit error rate; and determining the given speech frame to be bad when the TSC bit error rate for the bursts of the given speech frame is greater than the upper limit of the TSC bit error rate.

According to another aspect of the invention, there is provided a communications system, comprising: a user terminal communicating with one or more base stations, the user terminal being configured to receive speech frames including training sequence symbols or pilot symbols in a known number of successive burst on different channels of the communications system. The user terminal being further configured to define a TSC, training sequence code, bit error rate for the bursts of the given speech frame on the basis of the training sequence symbols or the pilot symbols; to define an upper limit for the TSC bit error rate; and to determine the given speech frame to be bad when the TSC bit error rate for the bursts of the given speech frame is greater than the upper limit for the TSC bit error rate.

According to another aspect of the invention, there is provided a communications system, comprising: a user terminal communicating with one or more base stations, a user terminal being configured to receive speech frames including training sequence symbols or pilot symbols in a known number of successive burst on different channels of the communications system, and to use Cyclic Redundancy Check for detecting errors in the received speech frames. When no errors in a given speech frame are discovered on the basis of the Cyclic Redundancy Check, the processing unit being further configured to define a TSC, training sequence code, bit error rate for the bursts of the given speech frame on the basis of the training sequence symbols or the pilot symbols; to define an upper limit for the TSC bit error rate; and to determine the given speech frame to be bad when the TSC bit error rate for the bursts of the given speech frame is greater than the upper limit for the TSC bit error rate.

According to another aspect of the invention, there is provided a receiver for a communications system, comprising: a processing unit for controlling functions of the receiver, a communications unit for receiving speech frames including training sequence symbols or pilot symbols in a known number of successive burst on different channels of the communications system. The processing unit being further configured to define a TSC, training sequence code, bit error rate for the bursts of the given speech frame on the basis of the training sequence symbols or the pilot symbols; to define an upper limit for the TSC bit error rate; and to determine the given speech frame to be bad when the TSC bit error rate for the bursts of the given speech frame is greater than the upper limit for the TSC bit error rate.

According to another aspect of the invention, there is provided a receiver for a communications system, comprising: a processing unit for controlling functions of the receiver, a communications unit for receiving speech frames including training sequence symbols or pilot symbols in a known number of successive burst on different channels of the communications system, the processing unit being configured to use Cyclic Redundancy Check for detecting errors in the received speech frames. When no errors in a given speech frame are discovered on the basis of the Cyclic Redundancy Check, the processing unit being further configured to define a TSC, training sequence code, bit error rate for the bursts of the given speech frame on the basis of the training sequence symbols or the pilot symbols; to define an upper limit for the TSC bit error rate; and to determine the given speech frame to be bad when the TSC bit error rate for the bursts of the given speech frame is greater than the upper limit for the TSC bit error rate.

According to another aspect of the invention, there is provided a receiver for a communications system, comprising processing means for controlling functions of the receiver, communication means for receiving speech frames including training sequence symbols or pilot symbols in a known number of successive bursts on different channels of the communications system, the processing means being configured to use Cyclic Redundancy Check for detecting errors in the received speech frames. The receiver further comprising first defining means for defining a TSC, training sequence code, bit error rate for the bursts of a given speech frame on the basis of the training sequence symbols or the pilot symbols when no errors in the given speech frame are discovered on the basis of the Cyclic Redundancy Check; second defining means for defining an upper limit of the TSC bit error rate; comparing means for comparing the defined TSC bit error rate and the upper limit for the TSC bit error rate; and determining means for determining the given speech frame to be bad when the TSC bit error rate for the bursts of the given speech frame is greater than the upper limit of the TSC bit error rate.

The invention provides several advantages. For example, performance is increased significantly, and throughput can be increased since no additional information bits are required in order to estimate the quality of the received signal. The embodiments of the invention are simple, robust and easy to implement.

LIST OF DRAWINGS

In the following, the invention will be described in greater detail with reference to the embodiments and the accompanying drawings, in which FIG. 1 illustrates an example of a communications system;

DESCRIPTION OF EMBODIMENTS

Figure 1:
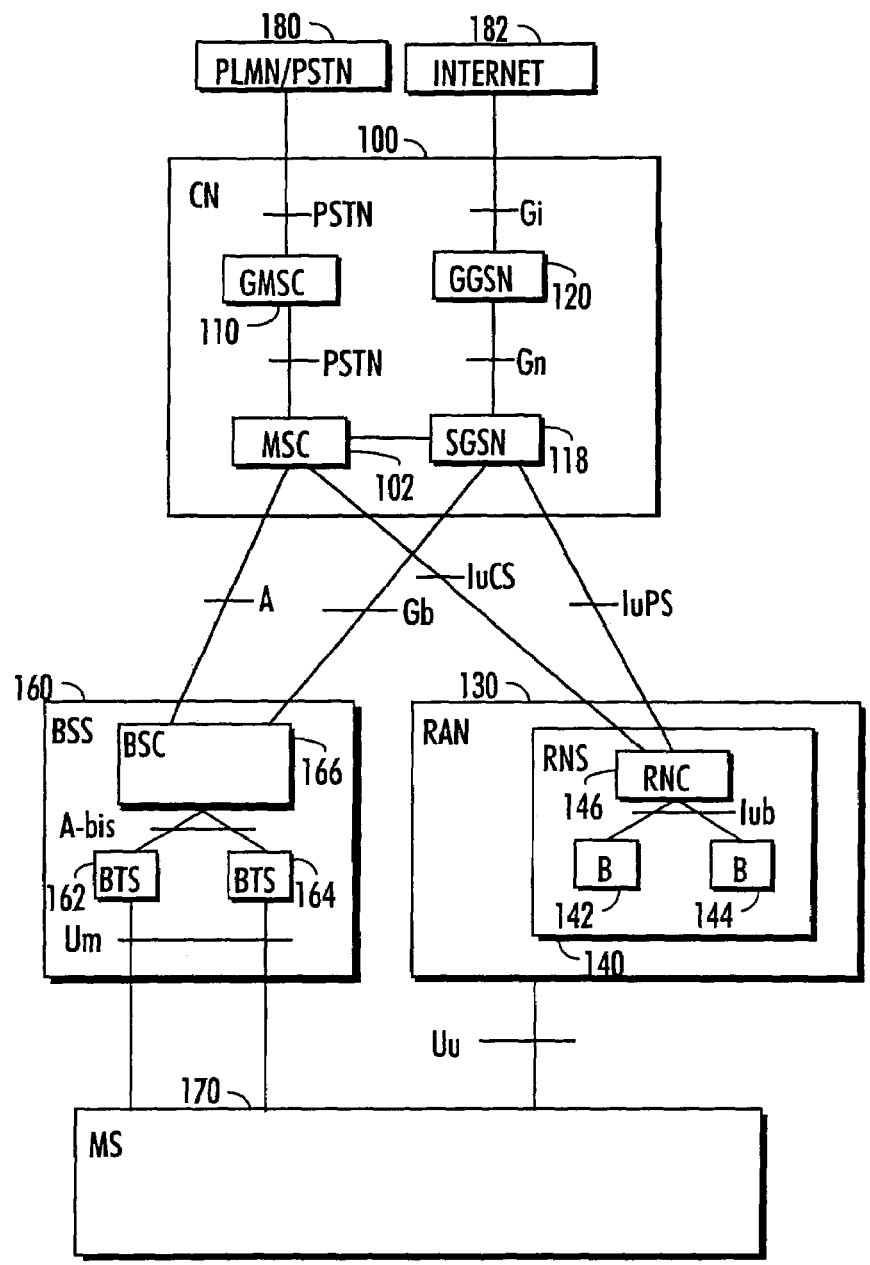

FIG. 1 is a simplified block diagram, which shows the most important parts of a communications system and the interfaces between them at network-element level. The main parts of a communications system are a core network (CN) 100, a radio access network 130, and user terminal (UE) 170. The structure and functions of the network elements are not described in detail, because they are generally known.

A mobile services switching center (MSC) 102 is a mobile network element that can be used to serve the connections of both radio access network and a base station system 160. The tasks of the mobile services switching center 102 include: switching, paging, user equipment location registration, handover management, collection of subscriber billing information, encryption parameter management, frequency allocation management, and echo cancellation. The number of mobile services switching centers 102 may vary: a small network operator may only have one mobile services switching center 102, but in large core networks 100 there may be several.

Large core networks 100 may have a separate gateway mobile ser-vices switching center (GMSC) 110, which takes care of circuit-switched connections between the core network 100 and external networks 180. The gateway mobile services switching center 110 is located between the mobile ser-vices switching center 102 and the external networks 180. An external network 180 can be for instance a public land mobile network (PLMN) or a public switched telephone network (PSTN).

A serving GPRS support node (SGSN) 118 is the center point of the packet-switched side of the core network 100. The main task of the serving GPRS support node 118 is to transmit and receive packets with user terminal 170 supporting packet-switched transmission by using the base station system 160. The serving GPRS support node 118 contains subscriber and location information related to the user terminal 170.

A gateway GPRS support node (GGSN) 120 is the packet-switched side counterpart to the gateway mobile services switching center of the circuit-switched side with the exception, however, that the gateway GPRS support node 120 is also capable of routing traffic from the core network 100 to external networks 182, whereas the gateway mobile services switching center only routes incoming traffic.

The base station system 160 comprises a base station controller (BSC) 166 and base transceiver stations (BTS) 162, 164. The base station controller 166 controls the base transceiver station 162, 164. The base station controller 166 takes care of the following tasks, for instance: radio resource management of the base transceiver station 162, 164, intercell handovers, frequency control, i.e. frequency allocation to the base transceiver stations 162, 164, management of frequency hopping sequences, time delay measurement on the uplink, implementation of the operation and maintenance interface, and power control.

The base transceiver station 162, 164 contains at least one transceiver, which provides one carrier, i.e. eight time slots, i.e. eight physical channels. Typically, one base transceiver station 162, 164 serves one cell, but it is also possible to have a solution in which one base transceiver station 162, 164 serves several sectored cells. The tasks of the base transceiver station 162, 164 include: calculation of timing advance (TA), uplink measurements, channel coding, encryption, decryption, and frequency hopping.

The radio access network 130 is made up of radio network subsystems 140. Each radio network subsystem 140 is made up of radio network controllers 146 and B nodes 142, 144.

The user terminal 170 comprises at least one transceiver for establishing a radio link to the base station system 160. The user terminal 170 can contain different subscriber identity modules. In addition, the user terminal 170 contains an antenna, a user interface and a battery.

In UMTS, the most important interfaces are the Iu interface between the core network and the radio access network, which is divided into interface IuCS on the circuit-switched side and interface IuPS on the packet-switched side, and interface Uu between the radio access network and the user equipment. In GSM/GPRS, the most important interfaces are the A interface between the base station controller and the mobile services switching center, the Gb interface between the base station controller and the serving GPRS support node, and the Um interface between the base transceiver station and the user equipment. The Um interface is the GPRS network interface for providing packet data services over the radio to the mobile station. The interface defines what kind of messages different network elements can use in communicating with each other.

Figure 2:
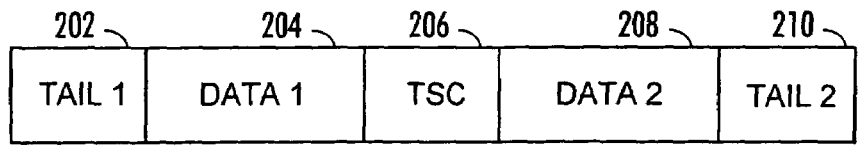
FIG. 2 shows an example of a normal burst in a GSM system.

FIG. 2 shows an example of a normal burst in a GSM system. A burst usually comprises 148 bits. The burst may comprise, for example, three tail bits 202, 58 data bits in a first data sequence 204, 26 training bits in a training sequence code 206, 58 data bits in a second data sequence 208, and three tail bits 210. The first and the second data sequences 204, 208 comprise subscriber communicated information, e.g. speech. The training sequence code 206 is a predetermined sequence that can be used for determining channel properties and signal quality. The training sequence code is known by the user terminal.

Figure 3:
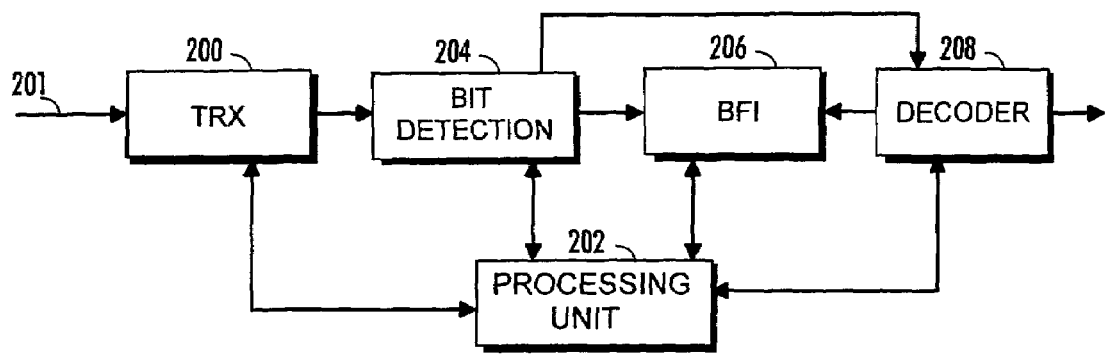
FIG. 3 illustrates an example of a receiver.

FIG. 3 illustrates a simplified block diagram of a receiver according to an embodiment. All the functions of the receiver are controlled by a processing unit 202. Signals are received from a communication channel 201 by a communications unit 200 of the receiver. The received speech frames include training sequence symbols or pilot symbols in a known number of successive bursts on different channels of the communications system. The received bursts are first detected in a Bit Detection unit 204 and then converted to samples of received data. A channel decoder 208 outputs data decisions. The channel decoder 208 extracts a speech frame by utilizing de-interleaving, scaling, and convolutional decoding. In an embodiment, the processing unit 202 is configured to use Cyclic Redundancy Check for detecting errors in the received speech frames.

In an embodiment, the estimation of bad frames is based on a TSC bit error rate and a CRC check defined by the 3GPP. In an embodiment, if any errors in frames has not been discovered on the basis of the Cyclic Redundancy Check, then a frame is marked bad if the TSC bit error rate for the bursts of the given frame is greater than the upper limit of the TSC bit error rate.

In an embodiment, when no errors in a given speech frame are discovered on the basis of the Cyclic Redundancy Check, the processing unit 202 is configured to define a TSC bit error rate for the bursts of the given speech frame on the basis of the training sequence symbols or the pilot symbols. The TSC bit error rate may be calculated on the basis of hard decisions available after a bit detection processing, e.g. after an equalizer. The processing unit is also configured to define an upper limit for the TSC bit error rate, and to determine the given speech frame to be bad when the TSC bit error rate for the bursts of the given speech frame is greater than the upper limit of the TSC bit error rate.

It is also possible that the proposed TSC bit error rate threshold method be used in a communications system where the CRC check is not utilized. For example, in field tests for indicating radio link quality, or in other communications systems where known symbol sequences or pilot symbols are transmitted and the link quality is to be estimated.

In an embodiment, a bad frame indication, BFI, algorithm for calculating the TSC bit error rates and making bad frame decisions controlled by the processing unit is located in the L1 layer receiver chain in a BFI unit 206. For each frame, a corresponding BFI flag is set. For speech frames the flags may be used by a RX-DTX handler to make a decision on each speech frame, i.e. depending on the BFI flags the speech frame can either be directly processed by a Speech Decoder, replaced by a muted version of the previous speech frame, or substituted by comfort noise. Hence the bad frame indication algorithm has a direct influence on actual speech quality when speech frames are received.

The Cyclic Redundancy Check, CRC, defined by the 3GPP for marking a speech frame good or bad also allows other measures to be used along with the CRC check. The CRC is carried out on some additional parity bits obtained in the TX by convolutional encoding. The number of CRC bits depends on the actual service; e.g. for TCH/FS, only three CRC bits are used, whereas for TCH/EFS eight CRC bits are used. The number of the CRC bits reflects the reliability of the CRC marking, i.e. the fewer the CRC bits the less reliable is the marking. Especially the three bit CRC check specified for TCH/HS and TCH/FS has shown to be far too unreliable for BFI marking alone.

In an embodiment, by applying for example four (half rate) and eight (full rate) burst interleaving, a proper TSC error threshold for the upper limit of the TSC bit error rate that fulfils the 3GPP BFI requirement can be set, without the rate of good speech frames marked as bad significantly increasing compared to a case where CRC check alone is applied. Since a TSC bit error rate standard deviation differs for the two interleave depths, two different TSC bit error rate thresholds can be identified empirically through simulations: the threshold value for the four burst interleave depth is 0.125, for example, and the threshold value for eight burst interleave depth is 0.159, for example. The threshold value of 0.125 identified for the four burst interleave depth can also be used for the eight burst interleave depth, for example. However, the lowering of the upper limit of the TSC bit error rate means that the probability of marking good frames as bad increases, which in turn degrades the FER performance. The threshold values are thus ideally as high as possible. Different thresholds can be used for the various numbers of CRC bits.

Embodiments of the invention can be applied in different communications systems, i.e. both in fixed wire systems and in wireless systems, where training sequence symbols/pilot symbols are transmitted occasionally or continuously. The proposed embodiments can be used in several receiver algorithms for signal quality estimation, for example in systems utilizing SNR, E[SNR], Var[SNR], PBER or similar measures. Some potential GSM RX algorithm candidates comprise: detecting poor reception of speech frames/data blocks, decoding uplink state flag, sleep function e.g. for RX discontinued transmission and AMR link adaptation.

The embodiments of the invention can be implemented in several ways and the most appropriate way depends on the structure of the training sequence symbols/pilot symbols in the actual system, i.e. where are the symbols located in the received data, whether they are received occasionally or continuously etc. One possible implementation of the proposed quality measure of the received signal may consist of estimating the quality of the received data by first specifying the number of symbols to consider. The number of symbols to consider may be all the training sequence symbols/pilot symbols contributing to the speech frame or data block of interest. Next an internal error variable is initiated to zero and the desired speech frame or block error rate criteria are defined. Then, the accumulation of wrongly received symbols is carried out, followed by the computation of the Error Rate in the received training sequence symbols/pilot symbols contributing to the speech frames or data block. Finally the computed Error Rate is validated against the predetermined frames or data block error rate criterion.

By utilizing the proposed quality measure based on the training sequence symbols/pilot symbols, an overall system throughput can be increased since no additional information bits are required from the transmitter in order to validate the quality of the received signal.

The CRC check alone is insufficient for BFI marking on the speech channels TCH/FS, TCH/EFS, TCH/HS, TCH/AFS and TCH/AHS. Since the number of frames contributing to a speech frame depends on the interleave depth, which is four for the supported half rate channels and eight for the supported full rate channels, information about the interleave depth, N, is also required. However, this information is already present on the L1 level. The TSC bit error rate per frame may be determined as:

$$FrameTSC_{BER} = \frac{\sum_{i=1}^{N} TSC(i)_{Errors}}{N \cdot TSC_{Lenght}} \quad (3)$$

where:

$FrameTSC_{BER}$ is a training sequence code bit error rate of a frame, $TSC(i)_{Errors}$ is the number of wrong TSC bits in burst i, $TSC_{Lenght}$ is the number of training sequence code elements per burst, and N is information about an interleave depth.

The number of wrong TSC bits in burst i are the total number of received detected TSC code bits that differs from the correct TSC code bits. In GSM one burst contains 26 training sequence code elements located in the middle of each burst.

Besides the CRC check, the proposed bad frame estimation is based on a simple fixed frame based TSC bit error rate threshold. The frames are therefore marked as bad if the following condition is fulfilled:

$(FrameTSC_{BER} > Threshold_{TSC})$ OR !CRC, where $Threshold_{TSC}$ is a TSC bit error rate threshold representing the upper limit for the TSC bit error rate per frame before the frame should be marked as bad. The proposed algorithm is based on the amount of TSC bit errors per frame, and a simple threshold is used to determine whether a given frame should be marked as bad or not. The TSC BER threshold can be service dependent. Thus, the upper limit for the TSC BER threshold is defined for each supported service, i.e. TCH/HS, TCH/FS, TCH/AHS, TCH/AFS, EFS separately.

Figure 4:
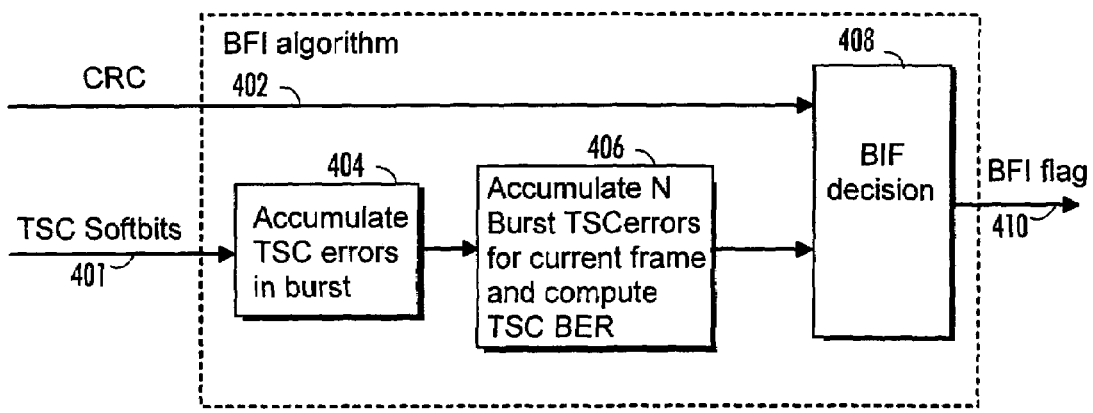
FIG. 4 illustrates an example of the new bad frame indication algorithm.

FIG. 4 illustrates an example of a bad frame indication algorithm that is run once per speech frame. The figure shows input and output signals 401, 402, 410 of the BFI algorithm. The input signal CRC flag 402 indicates to a BFI decision block 408 whether the CRC check has failed (False) or passed (True). The input signal TSC softbits 401 comprises TSC soft bit values received from a bit detector. An output signal BFI_flag 410 indicates whether the frame is marked as bad (True) or not (False).

Accumulate TSCerrors in burst block 404 accumulates the TSC bit errors per burst by validating a mapped hard bit of each of the 26 TSC softbits against the expected TSC bits. If a bit does not match, a $BurstTSC_{errors}$ variable is incremented by one. Block 404 outputs an accumulated number of wrongly demodulated TSC bits within a burst.

Accumulate N burst TSCerrors for current frame and Compute TSC BER block 406 accumulates the TSC errors for all bursts contributing to one speech frame and computes the TSC BER. The interleaving depth, N, determines the number of bursts to accumulate. When the TSC errors corresponding to a given frame are identified, the TSC bit error rate for that speech frame is computed by using formula (3).

BFI decision block 408 marks the decoded speech frame as bad if a predetermined condition is fulfilled. The BFI decision function can be implemented in several ways, for example for speech frames as follows:

BFI_flag=False
If(Half rate)
    $Threshold_{Tsc}=Threshold_{TSC\_HR}$
else
    $Threshold_{TSC}=Threshold_{TSC\_FR}$
end
if(($FrameTSC_{BER} > Threshold_{TSC}$) or!CRC)
    BFI_flag=True
end where $Threshold_{TSC\_HR}$ means the TSC BER threshold parameter for four burst interleave depth, $Threshold_{TSC\_FR}$ means the TSC BER threshold parameter for eight burst interleave depth. The BFI flag is initiated to false before the BFI validation. First, the TSC BER threshold is set according to the applied codec mode, i.e. half rate or full rate. Then, the BFI criteria is validated; if the Frame TSC BER increases the defined TSC BER threshold or if the CRC fails, the frame is marked as bad.

Figure 5:
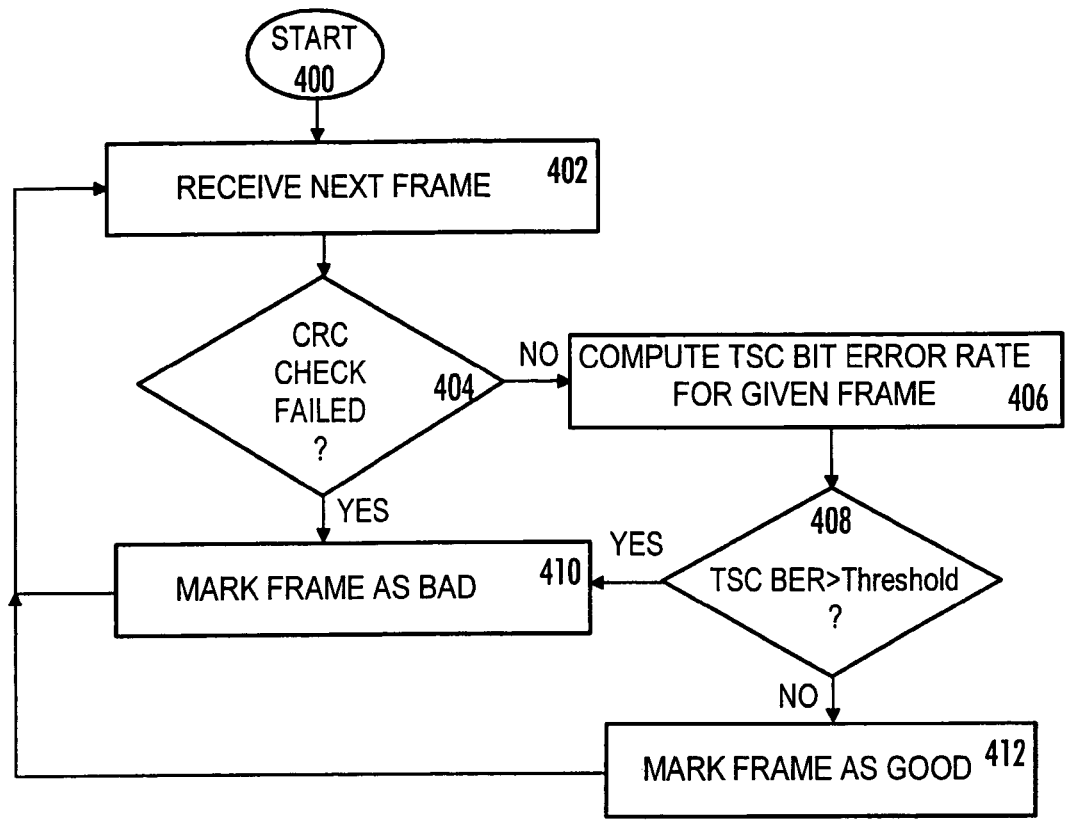
FIG. 5 shows an example of a method of estimating frame quality in a communications system.

FIG. 5 shows one example of a method of estimating speech frame quality in a radio system. The method starts in 400.

In 402, speech frames including training sequence symbols or pilot symbols are received. In 404, it is detected whether any errors in a given speech frame are discovered on the basis of Cyclic Redundancy Check. If the CRC check does not find any errors, then 406 is entered where a TSC bit error rate is defined for the bursts of the given received speech frame on the basis of the training sequence symbols or the pilot symbols. An upper limit for the TSC bit error rate is also defined. In 408, it is detected whether the TSC bit error rate for the bursts of the given speech frame is greater than the upper limit for the TSC bit error rate, and, if it is, 410 is entered and the given speech frame is marked as bad. If the comparison in 408 is not true, then 412 is entered and the speech frame is marked as good.

A set of BFI performance requirements is specified for speech frames in the 3GPP specification. There are two basic constrains: a requirement for bad speech frames marked as good and a requirement for good speech frames marked as bad. To specify the upper limit for the TSC bit error rate, the accuracy probability for marking a bad speech frame as bad can be used, i.e. to set the threshold for the upper limit, a tradeoff is done between the two constrains "bad speech frames marked as good" vs. "good speech frames marked as bad".

The proposed method operates isolated on a frame per frame basis and only one result is required, i.e. one common TSC bit error rate is computed for the bursts contributing to each frame. Thus, information about successive frames is not required. The TSC bit error rate is based on hard decision available after bit detection processing, that is, just before deinterleaving and channel decoder processing.

Even though the invention is described above with reference to an example according to the accompanying drawings, it is clear that the invention is not restricted thereto but it can be modified in several ways within the scope of the appended claims.

The invention claimed is:

1. A method comprising:
   receiving speech frames including one of training sequence symbols and pilot symbols, each speech frame being transmitted in a known number of successive bursts on different channels of a communications system;
   defining a training sequence code bit error rate for bursts of a given speech frame on a basis of the one of the training sequence symbols and the pilot symbols;
   defining an upper limit for the training sequence code bit error rate; and
   determining the given speech frame to be bad when the training sequence code bit error rate for the bursts of the given speech frame is greater than the upper limit of the training sequence code bit error rate.

2. The method of claim 1, the method further comprising using a cyclic redundancy check for detecting errors in transmitted speech frames, and carrying out the determining of the given speech frame to be bad based on the training sequence code bit error rate for the bursts of the given speech frame being greater than the upper limit of the training sequence code bit error rate when no errors in the given speech frame are discovered on a basis of the cyclic redundancy check.

3. A method comprising:
   receiving speech frames including one of training sequence symbols and pilot symbols, each speech frame being transmitted in a known number of successive bursts on different channels of a communications system, and, when no errors in a given speech frame are discovered on a basis of the Cyclic Redundancy Check, the method further comprises
   defining a training sequence code bit error rate for bursts of the given speech frame on a basis of the one of the training sequence symbols and the pilot symbols;
   defining an upper limit for the training sequence code bit error rate; and
   determining the given speech frame to be bad when the training sequence code bit error rate for the bursts of the given speech frame is greater than the upper limit of the training sequence code bit error rate.

4. The method of claim 3, wherein the defining of the training sequence code bit error rate for the bursts of the given speech frame comprises calculating the training sequence code bit error rate by using formula $$TSC_{BER} = \frac{\sum_{i=1}^{N} TSC(i)_{Errors}}{N \cdot TSC_{Length}},$$

where $TSC(i)_{Errors}$ is a number of wrong TSC symbols in burst i, $TSC_{Lenght}$ is a number of training sequence code elements per burst and N is an interleave depth of a channel.

5. The method of claim 3, wherein said defining of the training sequence code bit error rate for the bursts comprises defining the training sequence code bit error rate for the bursts wherein each burst contains 26 training sequence code elements.

6. The method of claim 3, further comprising defining the training sequence code bit error rate on a basis of hard decisions available after bit detection processing.

7. The method of claim 3, wherein said defining of the upper limit for the training sequence code bit error rate comprises defining the upper limit that is service dependent.

8. A communications system, comprising:
   a user terminal configured to communicate with at least one base station, the user terminal being configured to receive speech frames including one of training sequence symbols and pilot symbols in a known number of successive burst on different channels of a communications system, wherein the user terminal is further configured to define a training sequence code bit error rate for bursts of a given speech frame on a basis of the one of the training sequence symbols and the pilot symbols,
   wherein the user terminal is configured to define an upper limit for the training sequence code bit error rate, and
   wherein the user terminal is configured to determine the given speech frame to be bad when the training sequence code bit error rate for the bursts of the given speech frame is greater than the upper limit for the training sequence code bit error rate.

9. The communications system of claim 8, wherein the user terminal is further configured to use a cyclic redundancy check for detecting errors in the received speech frames, and determine the given speech frame to be bad based on the training sequence code bit error rate for the bursts of the given speech frame being greater than the upper limit of the training sequence code bit error rate when no errors in the given speech frame are discovered on a basis of the Cyclic Redundancy Check.

10. A system, comprising:
   a user terminal configured to communicate with at least one base station, the user terminal being configured to receive speech frames including one of training sequence symbols and pilot symbols in a known number of successive burst on different channels of a communications system, and to use a cyclic redundancy check to detect errors in the received speech frames, and when no errors in a given speech frame are discovered on a basis of the cyclic redundancy check, a processing unit is configured to define a training sequence code bit error rate for bursts of the given speech frame on a basis of the one of the training sequence symbols and the pilot symbols, wherein the processing unit is configured to define an upper limit for the training sequence code bit error rate, and wherein the processing unit is configured to determine the given speech frame to be bad when the training sequence code bit error rate for the bursts of the given speech frame is greater than the upper limit for the training sequence code bit error rate.

11. The system of claim 10, wherein the user terminal is configured to define the training sequence code bit error rate for the bursts of the received speech frames by using formula $$TSC_{BER} = \frac{\sum_{i=1}^{N} TSC(i)_{Errors}}{N \cdot TSC_{Length}},$$

where $TSC(i)_{Errors}$ is a number of wrong TSC symbols in burst i, $TSC_{Length}$ is a number of training sequence code elements per burst and N is an interleave depth of a channel.

12. An apparatus comprising:
a processing unit configured to control functions of the apparatus; and
a communications unit configured to receive speech frames including one of training sequence symbols and pilot symbols in a known number of successive bursts on different channels of a communications system,
wherein the processing unit is further configured to define a training sequence code bit error rate for bursts of a given speech frame on a basis of the one of the training sequence symbols and the pilot symbols,
wherein the processing unit is configured to define an upper limit for the training sequence code bit error rate; and
wherein the processing unit is configured to determine the given speech frame to be bad when the training sequence code bit error rate for the bursts of the given speech frame is greater than the upper limit for the training sequence code bit error rate.

13. The apparatus of claim 12, wherein the processing unit is further configured to use a cyclic redundancy check to detect errors in the received speech frames, and to determine the given speech frame to be bad based on the training sequence code bit error rate for the bursts of the given speech frame being greater than the upper limit of the training sequence code bit error rate when no errors in the given speech frame are discovered on a basis of the cyclic redundancy check.

14. The apparatus of claim 12, wherein the apparatus comprises a receiver.

15. An apparatus comprising:
a processing unit configured to control functions of the apparatus; and
a communications unit configured to receive speech frames including one of training sequence symbols and pilot symbols in a known number of successive bursts on different channels of a communications system,
the processing unit being configured to use a cyclic redundancy check to detect errors in the received speech frames, and when no errors in a given speech frame are discovered on a basis of the cyclic redundancy check, the processing unit is further configured to define a training sequence code bit error rate for bursts of the given speech frame on a basis of the one of the training sequence symbols and the pilot symbols,
wherein the processing unit is configured to define an upper limit for the TSC bit error rate; and
wherein the processing unit is configured to determine the given speech frame to be bad when the training sequence code bit error rate for the bursts of the given speech frame is greater than the upper limit for the training sequence code bit error rate.

16. The apparatus of claim 15, wherein the processing unit is configured to define the training sequence code bit error rate for the bursts of the received speech frame by using formula $$TSC_{BER} = \frac{\sum_{i=1}^{N} TSC(i)_{Errors}}{N \cdot TSC_{Length}},$$

where $TSC(i)_{Errors}$ is a number of wrong TSC symbols in burst i, $TSC_{Lenght}$ is a number of training sequence code elements per burst and N is an interleave depth of a channel.

17. The apparatus of claim 15, wherein each burst contains 26 training sequence symbols.

18. The apparatus of claim 15, wherein the processing unit is configured to define the training sequence code bit error rate on a basis of hard decisions available after bit detection processing.

19. The apparatus of claim 15, wherein the upper limit for the training sequence code bit error rate is service dependent.

20. The apparatus of claim 15, wherein the apparatus comprises a receiver.

21. An apparatus comprising:
processing means for controlling functions of the receiver, and communication means for receiving speech frames including one of training sequence symbols and pilot symbols in a known number of successive bursts on different channels of a communications system, the processing means being configured to use a cyclic redundancy check for detecting errors in the received speech frames, wherein the receiver further comprises
first defining means for defining a training sequence code bit error rate for bursts of a given speech frame on a basis of the one of the training sequence symbols and the pilot symbols when no errors in the given speech frame are discovered on a basis of the cyclic redundancy check;
second defining means for defining an upper limit of the training sequence code bit error rate;
comparing means for comparing the defined training sequence code bit error rate and the upper limit for the training sequence code bit error rate; and
determining means for determining the given speech frame to be bad when the training sequence bit error rate for the bursts of the given speech frame is greater than the upper limit of the training sequence code bit error rate.

* * * * *